(12) United States Patent
Hansson

(10) Patent No.: US 7,769,408 B2
(45) Date of Patent: Aug. 3, 2010

(54) MOBILE RADIO TERMINAL HAVING SPEAKER PORT SELECTION AND METHOD

(75) Inventor: Magnus Hansson, Lund (SE)

(73) Assignee: Sony Ericsson Mobile Communications AB, Lund (SE)

( * ) Notice: Subject to any disclaimer, the term of this patent is extended or adjusted under 35 U.S.C. 154(b) by 914 days.

(21) Appl. No.: 11/425,514

(22) Filed: Jun. 21, 2006

(65) Prior Publication Data

US 2007/0298827 A1    Dec. 27, 2007

(51) Int. Cl.
*H04M 1/00* (2006.01)
*H04B 1/38* (2006.01)

(52) U.S. Cl. ............... 455/550.1; 455/569.1; 455/575.3; 455/567; 455/90

(58) Field of Classification Search ............... 455/569.1, 455/575.1–575.8, 90.1–90.3; 379/433, 420, 379/433.02
See application file for complete search history.

(56) References Cited

U.S. PATENT DOCUMENTS

| 6,002,949 | A | * | 12/1999 | Hawker et al. | ............ | 455/569.1 |
| 6,104,808 | A | * | 8/2000 | Alameh et al. | ......... | 379/433.02 |
| 6,115,620 | A | * | 9/2000 | Colonna et al. | .......... | 455/569.1 |
| 6,567,677 | B1 | * | 5/2003 | Sokoloff | .................. | 455/575.1 |
| 6,819,946 | B2 | * | 11/2004 | Hansson | ................... | 455/569.1 |

FOREIGN PATENT DOCUMENTS

| DE | 196 40 412 C1 | 1/1998 |
| DE | 299 21 010 U1 | 3/2000 |
| GB | 2 329 300 | 3/1999 |
| WO | 2004-032465 | 4/2004 |

OTHER PUBLICATIONS

International Search Report for corresponding Application No. PCT/IB2006/003583 dated May 29, 2007.
International Preliminary Report on Patentability for corresponding International Application No. PCT/IB2006/003583, dated Oct. 1, 2008.

\* cited by examiner

*Primary Examiner*—Lester Kincaid
*Assistant Examiner*—Kuo Woo
(74) *Attorney, Agent, or Firm*—Renner, Otto, Boisselle & Sklar, LLP

(57) ABSTRACT

A mobile radio terminal having a housing with a loud speaker opening and an ear speaker opening and a speaker selection member coupled to and movable relative to the housing. The speaker selection member has a first audio port and a second audio port spaced such that the loud speaker opening is exposed through the first audio port when the speaker selection member is in a first position and the ear speaker opening is exposed through the second audio port when the speaker selection member is in a second position. In a third position, the loud speaker opening may be exposed through the second port or through a third audio port in the housing.

23 Claims, 5 Drawing Sheets

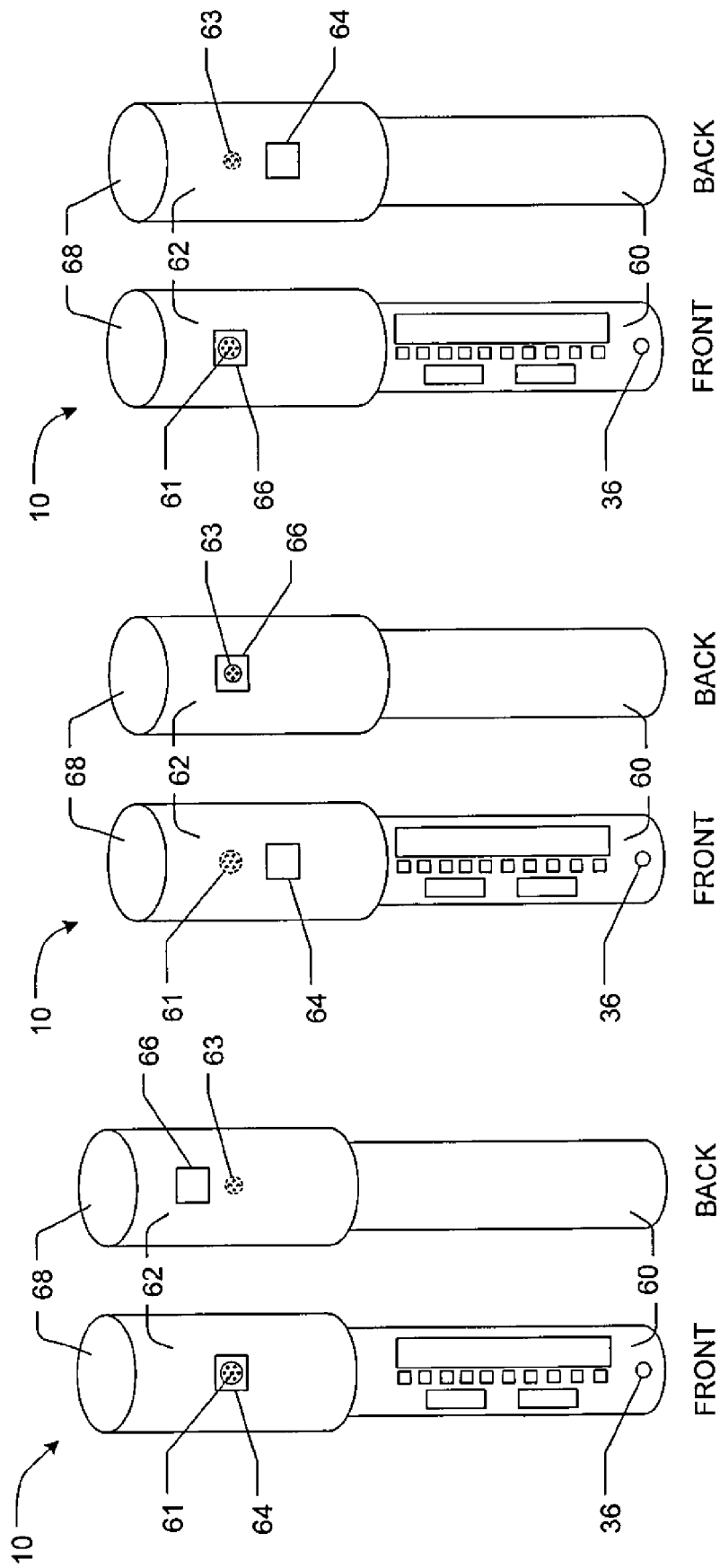

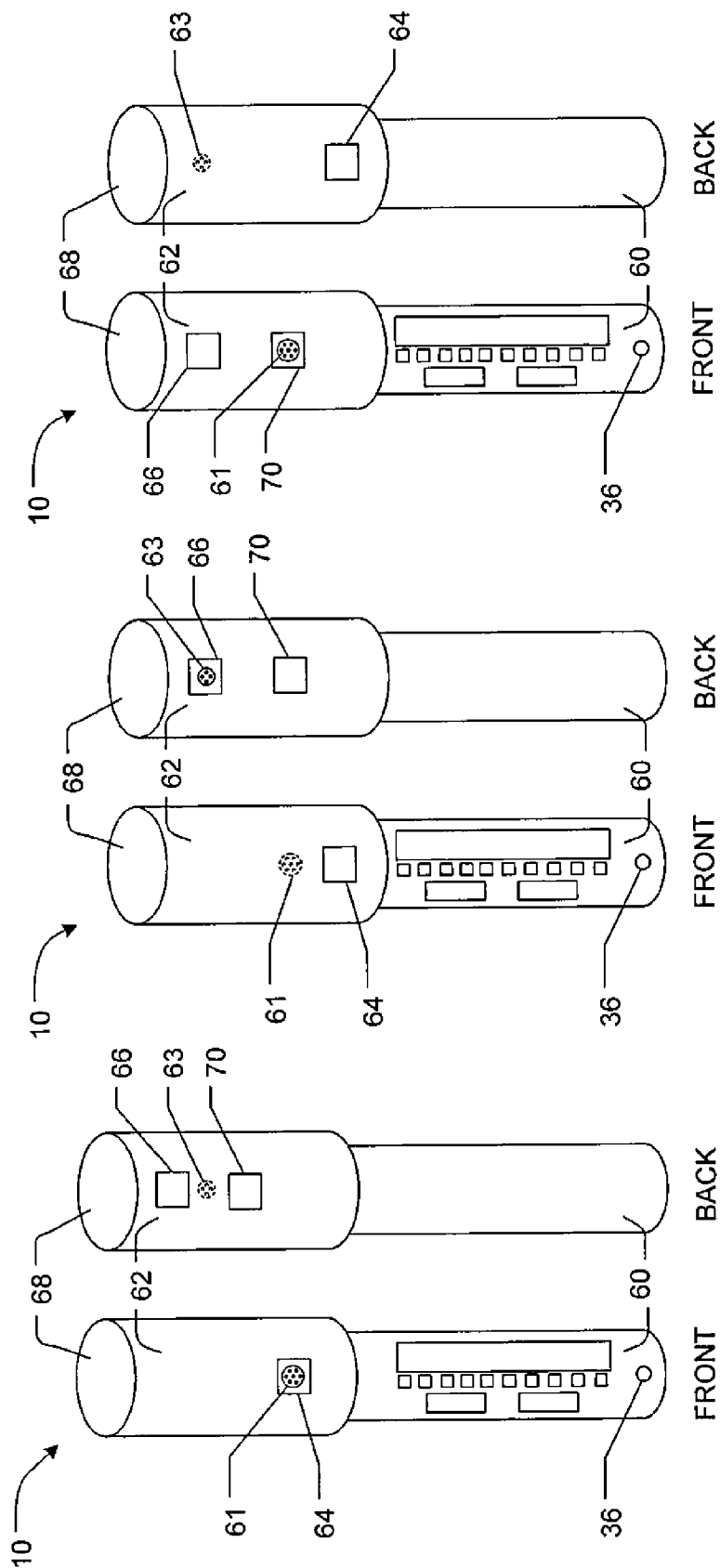

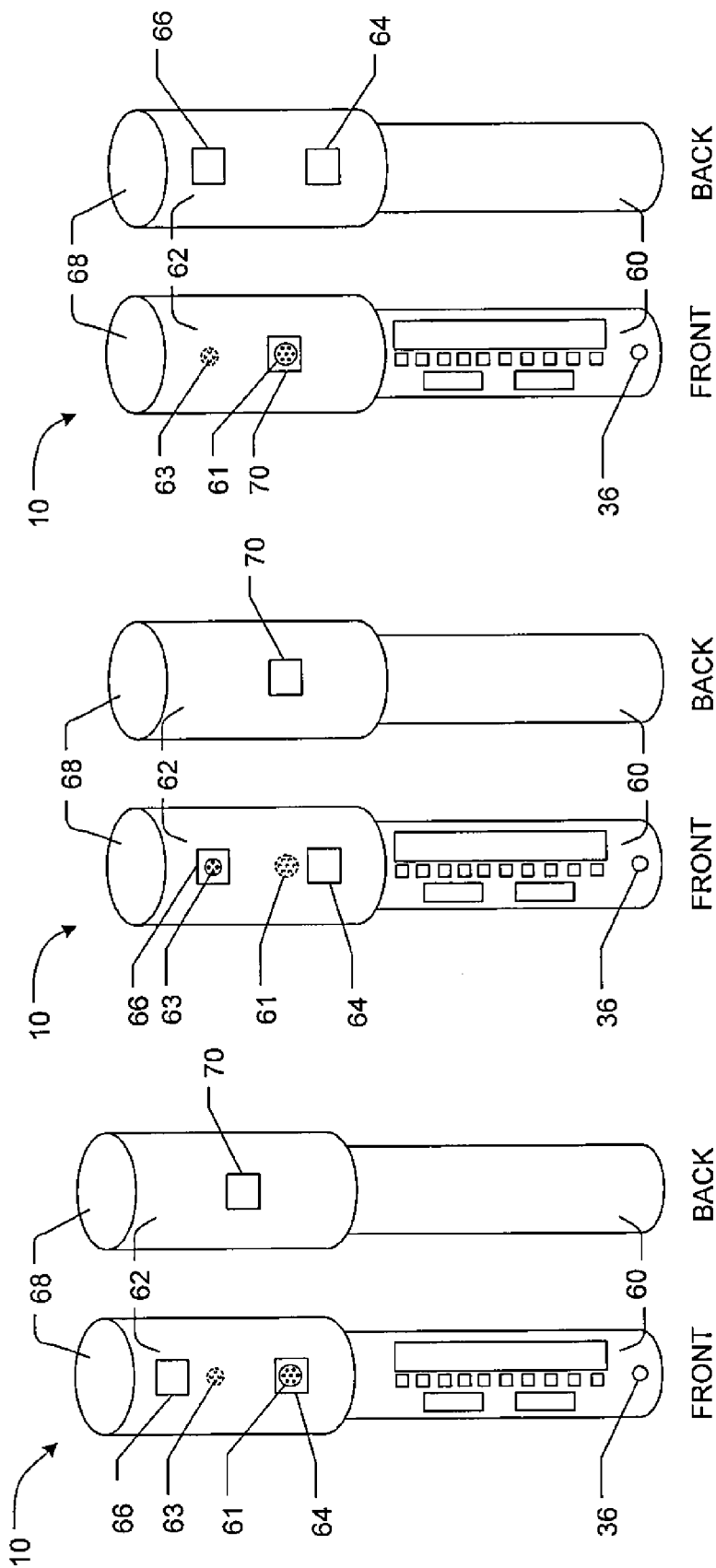

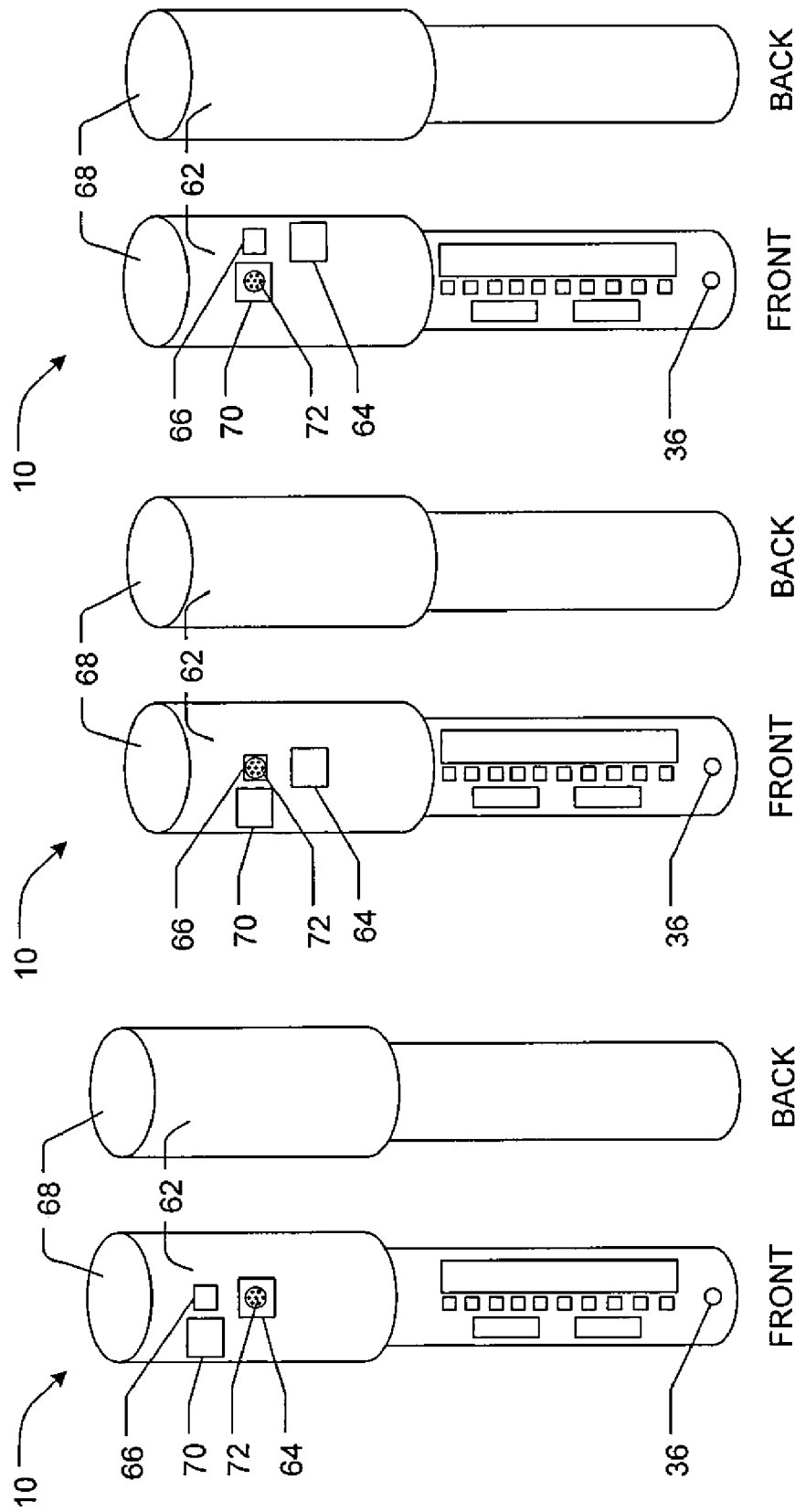

MOBILE RADIO TERMINAL HAVING SPEAKER PORT SELECTION AND METHOD

TECHNICAL FIELD OF THE INVENTION

The present invention relates generally to electronic equipment, such as electronic equipment for engaging in voice communications, and in particular, to exposing loud speaker openings and ear speaker openings according to the mode of operation of the electronic equipment.

DESCRIPTION OF THE RELATED ART

Some mobile telephones have two speaker openings, including a loud speaker opening and an ear speaker opening. The loud speaker opening may be acoustically coupled to a speaker, which typically is operable to output an audio sound (e.g., a ring tone) to announce an incoming call or to output an amplified incoming voice signal when the mobile telephone is operated in speakerphone mode. The ear speaker opening may be acoustically coupled to the speaker, which typically is operable to output audio sounds at a lower volume than the loud speaker so that the user can carry out a telephone call when the mobile telephone is held near the user's ear during a conversation mode, for example. In some mobile telephones, a single multi-purpose speaker may be utilized as both a loud speaker and an ear speaker with separate ports to a loud speaker opening and an ear speaker opening, while other mobile telephones may have two or more speakers.

Electronic equipment, and in particular, mobile telephones, are constantly being reduced in size. In smaller mobile telephones, the space between the loud speaker opening and the ear speaker opening tends to be reduced. Sometimes acoustic coupling between the loud speaker port and the ear speaker port allows sound to leak between the openings. In some cases, enough sound may leak through the ear speaker opening to cause a user to experience discomfort or an unpleasant listening experience if the mobile telephone is operating in loud speaker mode.

SUMMARY

According to one aspect, a mobile radio terminal with a housing including a loud speaker opening and having an ear speaker opening that is spaced from the loud speaker opening, a speaker selection member having at least a first audio port and a second audio port, the speaker selection member coupled with and movable relative to the housing such that the loud speaker opening is exposed by the first audio port when the speaker selection member is in a first position and the ear speaker opening is exposed by the second audio port when the speaker selection member is in a second position.

According to another aspect, the loud speaker opening is exposed through the second port when the speaker selection member is in a third position.

According to another aspect, the speaker selection member moves between the first and second positions by longitudinal movement relative to the housing.

According to another aspect, the speaker selection member moves between the second and third positions by rotational movement relative to the housing.

According to another aspect, the mobile radio terminal includes circuitry to place the mobile radio terminal in a ringer mode when the speaker selection member is in the first position.

According to another aspect, the circuitry places the mobile radio terminal in a handheld mode when the speaker selection member is in the second position.

According to another aspect, the circuitry places the mobile radio terminal in a speakerphone mode when the speaker selection member is in the third position.

According to another aspect, the mobile radio terminal includes a speaker acoustically coupled to the loud speaker opening and the ear speaker opening.

According to another aspect, the mobile radio terminal includes a first speaker acoustically coupled to the loud speaker opening and a second speaker acoustically coupled to the ear speaker opening.

According to another aspect, the speaker selection member includes a third audio port, wherein the loud speaker opening is exposed through the third audio port when the speaker selection member is in a third position.

According to another aspect, the mobile radio terminal includes circuitry to place the mobile radio terminal in a ringer mode when the speaker selection member is in the first position.

According to another aspect, the circuitry places the mobile radio terminal in a handheld mode when the speaker selection member is in the second position.

According to another aspect, the circuitry places the mobile radio terminal in a speakerphone mode when the speaker selection member is in the third position.

According to another aspect, the mobile radio terminal includes a speaker acoustically coupled to the loud speaker opening and the ear speaker opening.

According to another aspect, the mobile radio terminal includes a first speaker acoustically coupled to the loud speaker opening and a second speaker acoustically coupled to the ear speaker opening.

According to another aspect, the mobile radio terminal is a mobile telephone.

According to another aspect, the mobile radio terminal is a personal digital assistant (PDA).

According to another aspect, the housing is cylindrical.

According to another aspect, a method of using speakers in an electronic equipment having a housing and an a speaker selection member movable relative to one another, including the steps of exposing a loud speaker opening in the housing through a first audio port in the speaker selection member, exposing an ear speaker opening through a second audio port by moving the speaker selection member to a second position, and exposing the loud speaker opening through the second audio port by moving the speaker selection member to a third position.

According to another aspect, a program stored by a computer readable medium for controlling operation of a mobile radio terminal having a housing and an a speaker selection member movable relative to one another, including logic to operate the mobile radio terminal in a ringer mode when the speaker selection member is in a first position exposing a loud speaker opening though a first audio port in the speaker selection member, to operate the mobile radio terminal in a handheld mode when the speaker selection member is in a second position exposing an ear speaker through a second audio port in the speaker selection member, and to operate the mobile radio terminal in a speakerphone mode when the speaker selection member is in a third position exposing the loud speaker opening through the second audio port in the speaker selection member.

According to another aspect, the method includes code to play a ring tone through the loud speaker opening when the speaker selection member and the housing are in the first position and an incoming call is detected.

According to another aspect, the method includes code to output audio through the ear speaker opening when the speaker selection member and the housing are in the second position.

According to another aspect, the method includes code to output audio through loud speaker opening when the speaker selection member and the housing are in the third position.

These and further features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the claims appended hereto.

Features that are described and/or illustrated with respect to one embodiment may be used in the same way or in a similar way in one or more other embodiments and/or in combination with or instead of the features of the other embodiments.

It should be emphasized that the term "comprises/comprising" when used in this specification is taken to specify the presence of stated features, integers, steps or components but does not preclude the presence or addition of one or more other features, integers, steps, components or groups thereof.

BRIEF DESCRIPTION OF THE DRAWINGS

FIG. 4A schematically illustrates a front and back view of an exemplary mobile radio terminal in a first position having a loud speaker opening and an ear speaker opening that are radially aligned.

FIG. 4B schematically illustrates a front and back view of the mobile radio terminal of FIG. 4A in a second position.

FIG. 4C schematically illustrates a front and back view of the mobile radio terminal of FIG. 4B in a third position.

FIG. 5A schematically illustrates a front and back view of another exemplary mobile radio terminal in a first position having a loud speaker opening and an ear speaker opening at different locations along the longitudinal axis of the mobile radio terminal.

FIG. 5B schematically illustrates a front and back view of the mobile radio terminal of FIG. 5A in a second position.

FIG. 5C schematically illustrates a front and back view of the mobile radio terminal of FIG. 5B in a third position.

FIG. 6A schematically illustrates a front and back view of another exemplary mobile radio terminal in a first position having a loud speaker opening and an ear speaker that are longitudinally aligned.

FIG. 6B schematically illustrates a front and back view of the mobile radio terminal of FIG. 6A in a second position.

FIG. 6C schematically illustrates a front and back view of the mobile radio terminal of FIG. 6A in a third position.

FIG. 7A schematically illustrates a front and back view of a mobile radio terminal in a first position for another embodiment of a mobile radio terminal having a single speaker opening.

FIG. 7B schematically illustrates a front and back view of the mobile radio terminal of FIG. 7A in a second position.

FIG. 7C schematically illustrates a front and back view of the mobile radio terminal of FIG. 7A in a third position.

DETAILED DESCRIPTION OF EMBODIMENTS

Figure 2:
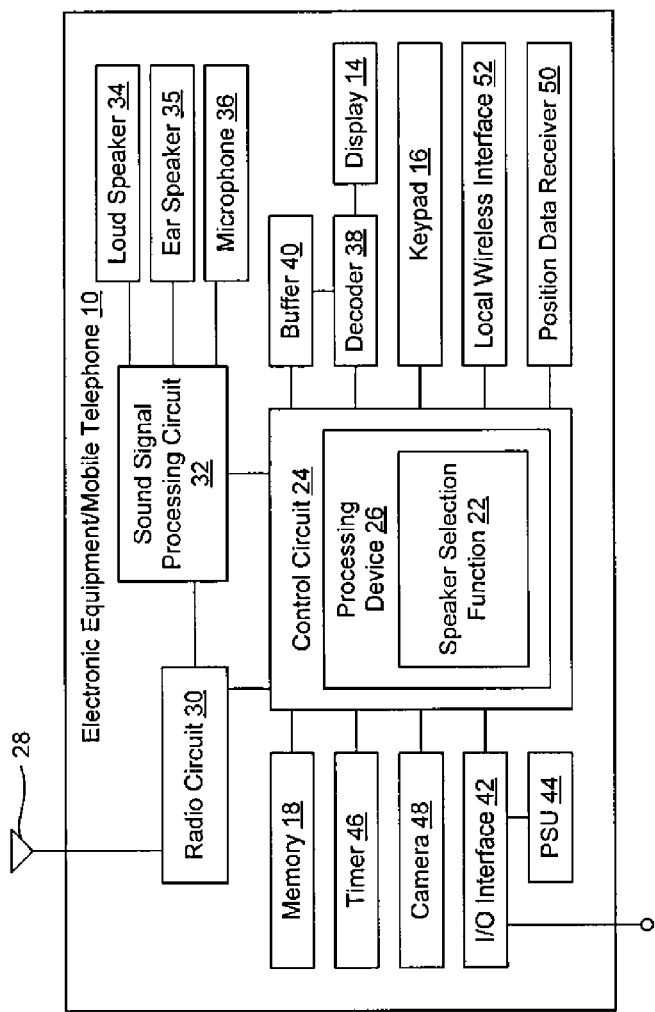
FIG. 2 is a schematic block diagram of the relevant portions of the mobile radio terminal of FIG. 1.

In the following description, with reference to the drawings, like reference numerals are used to refer to like elements throughout. It will be appreciated that the drawings are not necessarily to scale. Certain terminology is used herein to describe the different embodiments of the invention. Such terminology is used only for convenience when referring to the figures. For example, "vertically" or "horizontally" merely describe the configuration shown in the figures. The components can be oriented in any direction and the terminology should therefore be interpreted to include such variations.

The term "electronic equipment" includes portable radio communication equipment. The term "portable radio communication equipment," which herein after is referred to as a "mobile radio terminal," includes all equipment such as mobile telephones, pagers, communicators, electronic organizers, personal digital assistants (PDAs), smartphones, portable communication apparatuses or the like.

In the present application, the invention is described primarily in the context of a mobile telephone. It will be appreciated, however, that the invention is not intended to be limited to a mobile telephone and can be any type of electronic equipment.

Figure 1:
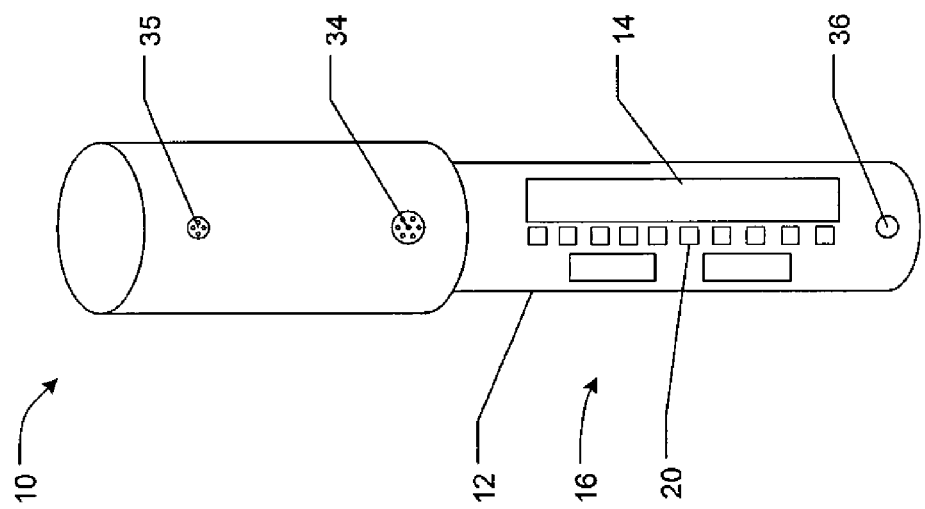
FIG. 1 is an exemplary embodiment of a mobile radio terminal.

Referring initially to FIG. 1, an electronic equipment 10 is shown. The electronic equipment in the illustrated embodiments is a mobile radio terminal and, in particular, a mobile telephone 10. Thus, the electronic equipment will be referred to as the mobile telephone 10. The mobile telephone 10 is shown as having a "cylindrical" or "pen-shape" form housing 12, but it will be appreciated that other type housings, such as a brick, block or slide-type housing, etc., may be utilized. It will be appreciated that the speaker selection function discussed below may be embodied as executable code that may be resident in and executed by the electronic equipment 10.

The mobile telephone 10 includes a display 14 and keypad 16. As is conventional, the display 14 displays information to a user such as operating state, time, telephone numbers, contact information, various navigational menus, etc., which enable the user to utilize the various features of the mobile telephone 10. The display 14 also may be used to visually display content received by the mobile telephone 10 and/or retrieved from a memory 18 (FIG. 2) of the mobile telephone 10. In addition, a phone number or a text message entered by the user may be displayed on the display 14 as part of a graphical user interface (GUI).

Similarly, the keypad 16 may be conventional in that it provides for a variety of user input operations. For example, the keypad 16 typically includes alphanumeric keys 20 for allowing entry of alphanumeric information such as telephone numbers, phone lists, contact information, notes, etc. In addition, the keypad 16 may include special function keys such as a "call send" key for initiating or answering a call, and a "call end" key for ending or hanging up or disconnecting a phone call. The mobile telephone 10 also may operate without call send or call end keys, or may have another button or mechanism for initiating and/or answering calls. For example, the mobile telephone 10 may operate similar to a ball point pen having a plunger or other mechanical apparatus to initiate and/or answer telephone calls, as described in more detail below.

The keypad 16 also may contain special function keys, which may include menu navigation keys, for example, for navigating through a menu displayed on the display 14 to select different telephone functions, profiles, settings, etc., as is conventional. Other keys associated with the mobile telephone 10 may include a volume key, an audio mute key, an on/off power key, a web browser launch key, a camera key, etc. Keys or key-like functionality also may be embodied as a touch screen associated with the display 14. The keys 20 may be used to enter written text (e.g., a string of alphanumeric characters) and to operate GUI menus, or to adjust or modify the mobile telephone settings, such as, for example, the brightness of the display, audio volume, etc.

The mobile telephone 10 includes conventional call circuitry that enables the mobile telephone 10 to establish a call and/or exchange signals with a called/calling device, typically another mobile telephone or landline telephone. The called/calling device need not be another telephone, however, it may be some other device such as an Internet web server, content providing server, etc.

FIG. 2 represents a functional block diagram of the mobile telephone 10. For the sake of brevity, generally conventional features of the mobile telephone 10 will not be described in great detail herein. The mobile telephone 10 includes a primary control circuit 24 that is configured to carry out overall control of the functions and operations of the mobile telephone 10. The control circuit 24 may include a processing device 26, such as a CPU, microcontroller or microprocessor. The processing device 26 executes code stored in a memory (not shown) within the control circuit 24 and/or in a separate memory, such as memory 18, in order to carry out operation of the mobile telephone 10. The memory 18 may be, for example, one or more of a buffer, a flash memory, a hard drive, a removable media, a volatile memory, a non-volatile memory or other suitable device. In addition, the processing device 26 executes code in order to perform a speaker selection function 22, which may include managing operation of a speaker or speakers in a ringer mode, a handheld mode, or a speakerphone mode, etc.

It will be apparent to a person having ordinary skill in the art of computer programming, and specifically in applications programming for mobile telephones or other electronic devices, how to program a mobile telephone 10 to operate and carry out the functions described herein. Accordingly, details as to the specific programming code have been left out for the sake of brevity. Also, while the speaker selection function 22 may be executed by the processing device 26, such functionality could also be carried out via dedicated hardware, firmware, software, or combinations thereof, without departing from the scope of the invention.

Continuing to refer to FIGS. 1 and 2, the mobile telephone 10 includes an antenna 28 coupled to a radio circuit 30. The radio circuit 30 includes a radio frequency transmitter and receiver for transmitting and receiving signals via the antenna 28 as is conventional. The radio circuit 30 may be configured to operate in a mobile communications system, as well as to receive data and/or audiovisual content or radio transmissions. For example, the receiver may be an IP datacast compatible receiver compatible with a hybrid network structure providing mobile communications and digital broadcast services, such as DVB-H mobile television and/or mobile radio. Other receivers for interaction with a mobile radio network or broadcasting network are possible and include, for example, GSM, CDMA, WCDMA, MBMS, WiFi, WiMax, DVB-H, ISDB-T, etc, as welt as advanced versions of these protocols.

The mobile telephone 10 further includes a sound signal processing circuit 32 for processing audio signals transmitted by/received from the radio circuit 30. Coupled to the sound processing circuit 32 is a speaker(s), which may be a loud speaker 34 and an ear speaker 35. Also coupled to the sound processing circuit is a microphone 36 that enables a user to speak via the mobile telephone 10 as is conventional. The radio circuit 30 and sound processing circuit 32 are each coupled to the control circuit 24 so as to carry out overall operation. Audio data may be passed from the control circuit 24 to the sound signal processing circuit 32 for playback to the user. The audio data may include, for example, audio data from an audio file stored by the memory 18 and retrieved by the control circuit 24. The sound processing circuit 32 may include any appropriate buffers, decoders, amplifiers and so forth.

For example, in a ringer mode or the first position (described below), the sound processing circuit 32 may use an amplifier to drive the loud speaker 34 to announce an incoming call by audibly outputting a ring tone, or to play back music, such as, for example stored or downloaded or streaming music, or AM/FM radio transmissions, or other audio content in an audiovisual playback mode. When the mobile telephone 10 is operating in a speakerphone mode, the sound processing circuit 32 may amplify a received audio transmission, such as, for example, the voice of an incoming transmission from a caller, for playback by the loud speaker 34. The mobile telephone also may operate in a handheld mode. When in handheld mode, the sound processing circuit 32 is operable to control the amplitude of the audio signal used to drive the ear speaker 35 so that sounds output by the ear speaker 35 have a volume appropriate for listening when the ear speaker 35 is positioned against the user's ear. As will be appreciated in the art, all audio gains and processing (e.g., echo cancellation, filtering, etc.) can be controlled and adapted for each mode of operation.

The mobile telephone 10 also includes the aforementioned display 14 and keypad 16 coupled to the control circuit 24. The display 14 may be coupled to the control circuit 24 by a video decoder 38 that converts video data to a video signal used to drive the display 14. The video data may be generated by the control circuit 24, retrieved from a video file that is stored in the memory 18, derived from an incoming video data stream received by the radio circuit 30 or obtained by any other suitable method. Prior to being fed to the decoder 38, the video data may be buffered in a buffer 40.

The mobile telephone 10 further includes one or more I/O interface(s) 42. The I/O interface(s) 42 may be in the form of typical mobile telephone I/O interfaces and may include one or more electrical connectors. As is typical, the I/O interface(s) 42 may be used to couple the mobile telephone 10 to a battery charger to charge a battery of a power supply unit (PSU) 44 within the mobile telephone 10. In addition, or in the alternative, the I/O interface(s) 42 may serve to connect the mobile telephone 10 to a wired personal hands-free adaptor (not shown), such as a headset (sometimes referred to as an earset) to audibly output sound signals output by the sound processing circuit 32 to the user. Further, the I/O interface(s) 42 may serve to connect the mobile telephone 10 to a personal computer or other device via a data cable. The mobile telephone 10 may receive operating power via the I/O interface(s) 42 when connected to a vehicle power adapter or an electricity outlet power adapter.

The mobile telephone 10 also may include a timer 46 for carrying out timing functions. Such functions may include timing the durations of calls, generating the content of time and date stamps, etc. The mobile telephone 10 may include a camera 48 for taking digital pictures and/or movies. Image and/or video files corresponding to the pictures and/or movies may be stored in the memory 18. The mobile telephone 10 also may include a position data receiver 50, such as a global positioning system (GPS) receiver, Galileo satellite system receiver or the like. The mobile telephone 10 also may include a local wireless interface 52, such as an infrared transceiver and/or an RF adaptor (e.g., a Bluetooth adapter), for establishing communication with an accessory, a hands-free adaptor (e.g., a headset that may audibly output sounds corresponding to audio data transferred from the mobile telephone 10 to the adapter), another mobile radio terminal, a computer or another device.

The mobile telephone 10 may be configured to transmit, receive and process data, such as text messages (e.g., colloquially referred to by some as "an SMS"), electronic mail messages, multimedia messages (e.g., colloquially referred to by some as "an MMS"), image files, video files, audio files, ring tones, streaming audio, streaming video, data feeds (including podcasts) and so forth. Processing such data may include storing the data in the memory 18, executing applications to allow user interaction with data, displaying video and/or image content associated with the data, outputting audio sounds associated with the data and so forth.

Figure 3:
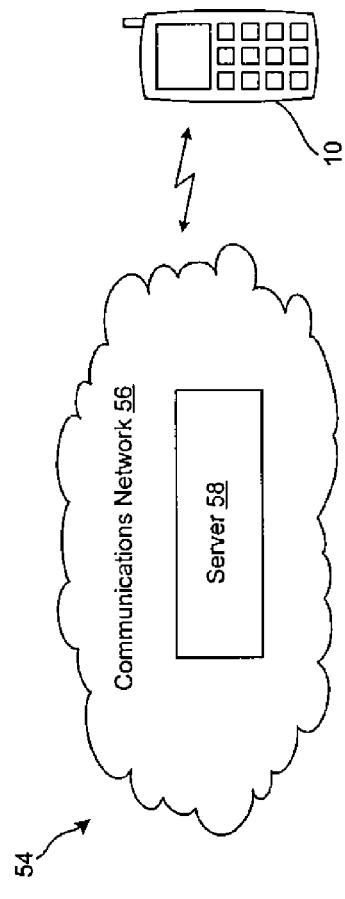
FIG. 3 is a schematic diagram of a communications system in which the mobile radio terminal of FIG. 1 may operate.

With additional reference to FIG. 3, the mobile telephone 10 may be configured to operate as part of a communications system 54. The system 54 may include a communications network 56 having a server 58 (or servers) for managing calls placed by and destined to the mobile telephone 10, transmitting data to the mobile telephone 10 and carrying out any other support functions. The server communicates with the mobile telephone 10 via a transmission medium. The transmission medium may be any appropriate device or assembly, including, for example, a communications tower, another mobile telephone, a wireless access point, a satellite, etc. Portions of the network may include wireless transmission pathways. The network 56 may support the communications activity of multiple mobile telephones 10, although only one mobile telephone 10 is shown in the illustration of FIG. 3.

In one embodiment, the server 58 may operate in stand alone configuration relative to other servers of the communications network 56 or may be configured to carry out multiple communications network functions. As will be appreciated, the server 58 may be configured as a typical computer system used to carry out server functions and may include a processor configured to execute software containing logical instructions that embody the functions of the server 58.

Referring to FIGS. 4A-4C, the mobile radio terminal 10 has a cylindrical housing 60 retaining the basic mobile telephone elements described above, such as, one or more speakers 34, 35, a microphone 36 and the circuitry and software necessary for operating the mobile radio terminal 10.

The housing 60 may have a loud speaker opening 61 for outputting sounds from the loud speaker 34, which may be relatively loud sounds (e.g., a voice when the mobile telephone 10 is in speakerphone mode or a ring tone to indicate receipt of a transmission, to announce an incoming call, or to playback downloaded or streamed music, etc.). The mobile telephone 10 also may have an ear speaker opening 63 for outputting sounds from the ear speaker 35 when the mobile telephone 10 is held against the user's ear as a handset. Alternatively, a single speaker may be used with circuitry or another mechanism for controlling the speaker to operate as a loud speaker, or to operate as an ear speaker, as described in more detail below.

The housing 60 may contain one or more speakers. The loud speaker opening 61 and ear speaker opening 63 may be acoustically coupled to the speaker(s) to allow sound to be transmitted from the speaker(s) to the speaker openings 61, 63. Acoustically coupled means any acoustic pathway or conveyance assembly. For example, a speaker may be positioned with respect to the openings (e.g., immediately behind the opening) or tubes or other structural members may be used to transport sound to the speaker openings. If a single speaker is used, it may be acoustically coupled to both the loud speaker opening 61 and the ear speaker opening 63, which may be spaced from one another and/or located on different sides of the mobile phone 10. When one speaker is used, acoustic resistance may be applied in the pathway to the ear speaker opening 63 to reduce the volume of the transmitted sound to an appropriate level for handset use. Similarly, the sound transmitted from the speaker to the loud speaker opening may be amplified for use of the mobile telephone 10 in speakerphone or ringer mode. A single opening may be acoustically coupled to a loud speaker and an ear speaker or a single multi-functional speaker. Unless otherwise specified, the below described embodiments may be configured with one or two speakers having appropriate acoustic coupling.

For purposes of illustration, the loud speaker opening 61 and the ear speaker opening 63 are located on opposite sides of the housing 60, however, it will be appreciated that in this and other embodiments, the speaker openings 61, 63 may be located anywhere on the housing 60 and may be on the same side of the housing 60.

Operation of the loud speaker 34 and the ear speaker 35 may be controlled by longitudinal and/or rotational movement of a speaker selection member 62 with respect to the housing 60. As shown in FIG. 4A, the loud speaker opening 61 and the ear speaker opening 63 may be radially aligned and positioned on different or opposite sides of the housing 60 (e.g., 180-degrees apart) or may be spaced apart by different angles (e.g., O-degrees or 90-degrees, etc.) and/or at different positions along the longitudinal axis of the housing 60. The speaker selection member 62 is shown surrounding the housing 60 and may be a cylindrical shape or may be a shroud surrounding a block-shape mobile radio terminal. The speaker selection member 62 also may be partially or completely surrounded by the housing 60.

Although not specifically described herein, any of a number of conventional attachment mechanisms may be used to cooperatively engage the speaker selection member 62 to the housing 60 so as to allow longitudinal and/or rotational movement, as will be appreciated by one of skill in the art. For example, in one embodiment, the speaker selection member 62 and the housing 60 may be assembled in a manner similar to the assembly of a ball point pen. In another embodiment, the speaker selection member 62 may be frictionally engaged to a portion of the housing 60 in such a manner so as to allow longitudinal and/or rotational movement between the speaker selection member 62 and the housing 60. In another embodiment, a tab and track may be used. In still another embodiment, the speaker selection member 62 may be rotated by a mechanical guide (i.e., the speaker selection member 62 may be spring-loaded with an electro-mechanical release to allow the mobile telephone 10 to automatically return to the first position when the call is ended.

The speaker selection member 62 may have plural audio ports 64, 66 for allowing sound to pass from the speakers 34, 35 through the speaker openings 61, 63 in the housing 60 and through the audio ports 64, 66, which may be selectively aligned with the loud speaker opening 61 or the ear speaker opening 63. The audio ports 64, 66 may be circular or square holes in the side walls of the speaker selection member 62. The audio ports and/or the loud speaker opening 61 and ear speaker opening 63 may be covered by a material, such as, for example, mesh or fabric, etc., to protect the speakers 34, 35 from exposure to dust or other potentially harmful materials. The audio ports 64, 66 and/or openings 61, 63 may include a pattern or grouping of apertures that expose a portion of the speakers 34, 35 or acoustic passages. Thus, the ports 64, 66 and/or openings 61, 63 need not comprise a continuous hole. The number and/or arrangement of apertures may control the perceptible loudness of the speakers 34, 35. For instance, the loudness of the sounds transmitted through the speaker selection member 62 may be proportional to the aggregate area of the apertures.

The audio ports 64, 66 are arranged with respect to the speaker openings 61, 63 and to each other to function as described herein. As shown in FIG. 4A, the second audio port 66 is located closer to the top 68 of the speaker selection member 62 than the first audio port 64. When the speaker selection member 62 is in a first position (FIG. 4A), the first audio port 64 is aligned with the loud speaker opening 61 and the second audio port 66 is located closer to the top 68 of the speaker selection member 62 than (e.g., not radially aligned with) the ear speaker opening 63. In this first position, the first audio port 64 exposes the loud speaker opening 61 and allows sounds from the loud speaker opening 61 to pass through the speaker selection member 62 to be heard by the user. In this position, the speaker selection member 62 covers the ear speaker opening 63 to reduce the audibility of sounds from the ear speaker opening 63, thereby allowing the ear speaker opening 63 and the loud speaker opening 61 to share an internal cavity without sound leakage from the loud speaker opening 61 through ear speaker opening 63 and to the user's ear should the phone be held against the user's ear while the loud speaker opening 61 is exposed. In addition, the sound processing circuit 32 may be controlled to not deliver a sound signal to the ear speaker opening 63 when the speaker selection member 62 is in the first position.

When operating in the first position, the circuitry of the mobile telephone 10 controls the loud speaker 34 in a ringer mode. For instance, the speaker selection function 22 may control the sound processing circuit 32 in a manner to carry out the functions and audio behavior of the ringer mode. In ringer mode, an audible signal or noise is transmitted through the loud speaker opening 61 when the mobile telephone 10 receives a signal indicating, for example, that a text message or voice telephone call is being received. The position of the speaker selection member 62 may close electrical contacts or activate switches to provide feedback to the control circuit 24 such that the speaker selection function 22 may invoke the operational mode corresponding to the physical position of the speaker selection member 62.

The second position is illustrated by FIG. 4B. The user may expose the ear speaker opening 63 through the second audio port 66 by depressing the speaker selection member, or by moving the speaker selection member 62 longitudinally with respect to the housing 60. If a signal is received by the mobile telephone 10, such as a phone call, the user may answer the call by pressing the top 68 of the speaker selection member 62, causing the speaker selection member 62 to move downwards along the longitudinal length of housing 60, similar to the motion used to expose the tip of a ball point pen.

In the second position, the handheld mode of operation may be activated. In this mode, the user may hold the mobile telephone 10 near the user's ear for communication with a person on the other end of the call. As shown in FIG. 4B, a portion of the speaker selection member 62 is moved in front of the loud speaker opening 61. This portion of the speaker selection member 62 may dampen or reduce the audio, if any, emitted from the loud speaker opening 61. Thus, the user may use the mobile telephone 10 as a handset while minimizing the exposure of the user's ear to audio output by the loud speaker opening 61. In addition, the sound processing circuit 32 may be controlled not to deliver a sound signal to the loud speaker opening 63 when the speaker selection member 62 is in the second position.

The speaker selection member 62 may be twisted or rotated with respect to the housing 60 to a third position, as illustrated by FIG. 4C. In the third position, the mobile telephone 10 may enter the speakerphone mode. After the speaker selection member 62 is rotated, the second audio port 66 is aligned with and exposes the loud speaker opening 61, while the portion of the speaker selection member 62 that was blocking the loud speaker opening 61 may block the ear speaker opening 63. The first audio port 64 therefore is longitudinally aligned with, the ear speaker opening 63, with the ear speaker opening 63 located between the top 68 of the speaker selection member 62 and the first acoustic port 64. In addition, the sound signal processing circuit 32 may be controlled to not deliver a sound signal to the ear speaker opening 63 when the speaker selection member 62 is in the third position.

When operating in the third position, the circuitry of the mobile telephone 10 may activate the speaker to transmit sound through the loud speaker opening 61 so that the mobile telephone 10 may be used in speakerphone mode, allowing the user to place the mobile telephone 10 on a nearby surface, for example, a table or dashboard, to talk in a "hands-free" manner, listen to music, listen to an audio component of a video presentation, etc.

The circuitry of the mobile telephone 10 also may be operable to control the microphone 36. The circuitry may activate the microphone 36 when the mobile telephone 10 is in the second and third positions (FIGS. 4B and 4C) and may disable the microphone 36 when the mobile telephone 10 is in the first position (FIG. 4A). The gain applied to the output signal of the microphone 36 may be higher in the third position than in the second position. The circuitry and programming for controlling the microphone 36 in each of the three positions is well known to one of skill in the art, and therefore will not be discussed in detail.

At any time, the speaker selection member 62 may be returned to the first position. When the speaker selection member 62 is returned to the first position, the circuitry of the mobile telephone 10 operates to disconnect or hang-up a call if the mobile telephone 10 was actively supporting a call. When the speaker selection member 62 is returned to the first position, the first audio port 64 will expose the loud speaker opening 61, which will be operational as a ringer, as described above.

If another call is received, the user can move the speaker selection member 62 to the second position by depressing or longitudinally moving the speaker selection member 62, which will activate the mobile telephone 10 and allow the user to answer the call. Similarly, if the user desires to place a phone call, the user may enter the phone number with the key pad 16 and depress the speaker selection member 62 to activate the mobile telephone 10, place the call, and expose the ear speaker opening 63. The user also may bypass the handheld mode by depressing and twisting the speaker selection member 62 to proceed directly to speakerphone mode.

In the following embodiments of FIGS. 5A-7C, the operation of the mobile telephone 10 when the speaker selection member 62 in each of the first, second and third positions remains substantially the same as described above, however, the radial or longitudinal location of the audio ports and speaker openings may be changed to accommodate a different arrangement of speakers or performance characteristics. Accordingly, functional similarities between the embodiments described above and the embodiments described below will be omitted for the sake of brevity.

Referring now to FIGS. 5A-5C, the speaker selection member 62 may have three audio ports 64, 66, 70 that align with and expose the loud speaker opening 61 and the ear speaker opening 63 when the speaker selection member 62 is moved to the various positions. When the speaker selection member 62 is in the first position, the first audio port 64 is aligned with the loud speaker opening 61, exposing it for operation of the mobile telephone 10 in ringer mode. The second audio port 66, third audio port 70, and ear speaker opening 63 are longitudinally aligned such that the second audio port 66 is closer to the top 68 of the speaker selection member 62 than the ear speaker opening 63, and the ear speaker opening 63 is closer to the top 68 of the speaker selection member 62 than the third audio port 70. The third audio port 70 is closer to the top 68 of the speaker selection member 62 than the first audio port 64, located along the longitudinal axis of the speaker selection member 62 such that when the mobile radio terminal is in the second position, the third audio port 70 is radially, but not longitudinally aligned, with the loud speaker opening 61.

Referring to FIG. 5B, when the user depresses the speaker selection member 62 or moves the speaker selection member 62 and the housing 60 longitudinally with respect to each other, the second audio port 66 is moved below the loud speaker opening 61 and a portion of the speaker selection member 62 blocks the loud speaker opening 61. The second audio port 66 is moved to align with and expose the ear speaker opening 63, allowing the user to use the mobile telephone 10 in handheld mode. In this position, the third audio port 70 is then radially aligned with the loud speaker opening 61, but on a different side of the speaker selection member 62.

In FIG. 5C, the speaker selection member 62 has been rotated relative to the housing 60 to expose the loud speaker opening 61 and operate the mobile telephone 10 in speakerphone mode. When rotated, the second audio port 66 and third audio port 70 generally are longitudinally aligned with the loud speaker opening 61, with the third audio port 70 exposing the loud speaker opening 61 for hands-free speakerphone operation. The user then can either disconnect the call by returning the speaker selection member 62 to the first position (FIG. 5A), or rotate the speaker selection member 62 back to the second position (FIG. 5B) to expose the ear speaker opening 63 and use the mobile telephone 10 in handheld mode. The speaker openings 61, 63 and the audio ports 64, 66, 70 may be spaced such that the speaker selection member 62 may be rotated a half-turn or a quarter-turn, etc., to accommodate different speaker opening configurations, as will be appreciated by one of skill in the art.

FIGS. 6A-6C depict another embodiment of the mobile radio terminal 10. The speaker selection member 62 is in the first position as illustrated in FIG. 6A. The loud speaker opening 61 and ear speaker opening 63 may be spaced from one another and may be contained on the same side of the housing 60. such that they are longitudinally aligned with the loud speaker opening 61 and the ear speaker opening 63. The first audio port 64 and second audio port 66 are spaced such that the loud speaker opening 61 is exposed through the first audio port 64. The second audio port 66 is closer to the top 68 of the speaker selection member 62 than the ear speaker opening 63. The portion of the speaker selection member 62 between the first audio port 64 and the second audio port 66 substantially blocks the ear speaker opening 63 when the speaker selection member 62 is in the first position (FIG. 6A). The third audio port 70 may be located on a different side of the speaker selection member 62 and radially aligned with the portion of the speaker selection member 62 blocking the ear speaker opening 63.

FIG. 613 depicts the location of the audio ports 64, 66, 70 when the speaker selection member 62 is moved longitudinally with respect to the housing 60 to the second position. As shown, the second audio port 66 exposes the ear speaker opening 63, while a portion of the speaker selection member 62 is moved to substantially block the loud speaker opening 61. The third audio port 70 is moved such that it is radially aligned with the loud speaker opening 61, but on a different side of the mobile telephone 10.

In FIG. 6C, the speaker selection member 62 has been rotated to the third position to align the third audio port 70 with the loud speaker opening 61 to allow the mobile telephone 10 to be operated in speakerphone mode.

FIGS. 7A-7C depicts a further embodiment of the mobile radio terminal 10. A single speaker 72 capable of operating as a loud speaker 34 and as an ear speaker 35 may be contained within the housing 60. Alternatively, the illustration of FIGS. 7A-7C may depict may depict a single speaker port acoustically coupled to two or more speakers, which may be contained within the housing 60. The actual mode of operation of the speaker 72, e.g., as a ringer, an ear speaker 35 or loud speaker 34 for a speakerphone, can be controlled by the control circuit 24, as will be appreciated by one of skill in the art. As shown in FIG. 7A, the speaker selection member 62 has three audio ports 64, 66, 70. The first audio port 64 and the third audio port 70 may be somewhat larger (e.g., in terms of aggregate opening area) than the second audio port 66 for loud speaker use.

In the first position (FIG. 7A), the second audio port 66 is aligned with and exposes the speaker 72, which operates as a loud speaker to indicate an incoming transmission. The second audio port 66 may be longitudinally aligned with the first audio port 64, such that when the user depresses or moves the speaker selection member 62 longitudinally with respect to the housing 60, as shown in FIG. 7B, and the second audio port 66 exposes the speaker 72, which then operates as an ear speaker 35 for using the mobile telephone 10 in handheld mode. When in the second position, the third audio port 70 is radially aligned with the speaker 72 on a different side of the speaker selection member 62. When the speaker selection member 62 and the housing 60 are rotated with respect to one another, the speaker selection member 62 may be placed in the third position (FIG. 7C) so that the third audio port 70 aligns with speaker 72 to allow operation of the mobile telephone 10 in speakerphone mode.

In each embodiment, movement of the speaker selection member 62 with respect to the housing 60 has been described. It will be appreciated that the description of such movement herein expressly includes movement of the housing 60 with respect to the speaker selection member 62, movement of both components and/or movement of additional components. Also, the longitudinal movements may be replaced with or combined with rotating and/or axial movements, and/or the rotating movements may be replaced with or combined with longitudinal and/or axial movements.

Although the invention has been shown and described with respect to certain embodiments, it is understood that equivalents and modifications will occur to others skilled in the art upon the reading and understanding of the specification. The present invention includes all such equivalents and modifications, and is limited only by the scope of the following claims.

What is claimed is:

1. A mobile radio terminal comprising:

a housing having a loud speaker opening and having an ear speaker opening that is spaced from the loud speaker opening;

a cylindrical speaker selection member having a plurality of audio ports and an internal surface contoured to a surface of the housing so that the speaker selection member coupled with the housing and longitudinally and rotatably movable relative to the housing such that the loud speaker opening is exposed by one of the audio ports and the ear speaker opening is covered by the speaker selection member when the speaker selection member is in a first position, the ear speaker opening is exposed by a different audio port and the loud speaker opening is covered by the speaker selection member when the speaker selection member is moved longitudinally relative to the housing to a second position, and the loud speaker opening is exposed by one of the plurality of openings and the ear speaker opening is covered by the speaker selection member when the speaker selection member is rotated relative to the housing to a third position.

2. The mobile radio terminal of claim 1, wherein the plurality of audio ports comprise a first audio port and a second audio port, and the loud speaker opening is exposed through the first audio port when the speaker selection member is in the first position or the third position and the ear speaker opening is exposed through the second audio port when the speaker selection member is in the second position.

3. The mobile radio terminal of claim 2, further comprising circuitry to place the mobile radio terminal in a ringer mode when the speaker selection member is in the first position.

4. The mobile radio terminal of claim 3, wherein the circuitry places the mobile radio terminal in a handheld mode when the speaker selection member is in the second position.

5. The mobile radio terminal of claim 4, wherein the circuitry places the mobile radio terminal in a speakerphone mode when the speaker selection member is in the third position.

6. The mobile radio terminal of claim 5, further comprising a speaker acoustically coupled to the loud speaker opening and the ear speaker opening.

7. The mobile radio terminal of claim 5, further comprising a first speaker acoustically coupled to the loud speaker opening and a second speaker acoustically coupled to the ear speaker opening.

8. The mobile radio terminal of claim 1, wherein the plurality of audio ports comprise a first audio port, a second audio port and a third audio port, and the loud speaker opening is exposed through the first audio port when the speaker selection member is in the first position, the ear speaker opening is exposed through the second audio port when the speaker selection member is in the second position, and the loud speaker opening is exposed through the third audio port when the speaker selection member is in the third position.

9. The mobile radio terminal of claim 8, further comprising circuitry to place the mobile radio terminal in a ringer mode when the speaker selection member is in the first position.

10. The mobile radio terminal of claim 9, wherein the circuitry places the mobile radio terminal in a handheld mode when the speaker selection member is in the second position.

11. The mobile radio terminal of claim 10, wherein the circuitry places the mobile radio terminal in a speakerphone mode when the speaker selection member is in the third position.

12. The mobile radio terminal of claim 11, further comprising a speaker acoustically coupled to the loud speaker opening and the ear speaker opening.

13. The mobile radio terminal of claim 11, further comprising a first speaker acoustically coupled to the loud speaker opening and a second speaker acoustically coupled to the ear speaker opening.

14. The mobile radio terminal of claim 1, wherein the mobile radio terminal is a mobile telephone.

15. The mobile radio terminal of claim 1, wherein the mobile radio terminal is a personal digital assistant (PDA).

16. The mobile radio terminal of claim 1, wherein the housing is cylindrical.

17. A method of using speakers in an electronic equipment having a housing and a cylindrical speaker selection member with a plurality of audio ports, wherein the speaker selection, member has an internal surface contoured to a surface of the housing so that the speaker selection member is longitudinally and rotatably movable relative to the housing, the method comprising the steps of:
exposing a loud speaker opening in the housing through one of the plurality of audio ports and covering the ear speaker opening with the speaker selection member when the speaker selection member is in the first position;
longitudinally moving the speaker selection member relative to the housing to a second position to expose an ear speaker opening through a different audio port and to cover the loud speaker opening with the speaker selection member; and
rotatably moving the speaker selection member relative to the housing to a third position to expose the loud speaker opening through one of the audio ports and to cover the ear speaker opening with the speaker selection member.

18. A non-transitory computer readable medium, storing a program for controlling operation of a mobile radio terminal having a housing and a cylindrical speaker selection member having an internal surface contoured to a surface of the housing such that the housing and the speaker selection member are movable relative to one another, the program comprising logic to:
operate the mobile radio terminal in a ringer mode when the speaker selection member is in a first position exposing a loud speaker opening though a first audio port in the speaker selection member and covering an ear speaker opening with the speaker selection member;
operate the mobile radio terminal in a handheld mode when the speaker selection member moved longitudinally relative to the housing to a second position exposing the ear speaker through a second audio port in the speaker selection member and covering the loud speaker opening with the speaker selection member; and
operate the mobile radio terminal in a speakerphone mode when the speaker selection member is rotated relative to the housing to a third position exposing the loud speaker opening through the second audio port in the speaker selection member and covering the ear speaker opening with the speaker selection member.

19. The non-transitory computer readable medium of claim 18, further comprising code to play a ring tone through the loud speaker opening when the speaker selection member is in the first position and an incoming call is detected.

20. The non-transitory computer readable medium of claim 18, further comprising code to output audio through the ear speaker opening when the speaker selection member is in the second position.

21. The non-transitory computer readable medium of claim 18, further comprising code to output audio through loud speaker opening when the speaker selection member is in the third position.

22. The mobile radio terminal of claim 16, wherein the speaker selection member is concentrically coupled with the housing.

23. The mobile radio terminal of claim 22, wherein one of the audio ports of the speaker selection member is circumferentially offset from the other audio port.

* * * * *